(12) United States Patent
Kim et al.

(10) Patent No.: US 11,668,485 B2
(45) Date of Patent: *Jun. 6, 2023

(54) ARTIFICIAL INTELLIGENCE AIR CONDITIONER AND METHOD FOR CALIBRATING SENSOR DATA OF AIR CONDITIONER

(71) Applicant: LG Electronics Inc., Seoul (KR)

(72) Inventors: Jaehong Kim, Seoul (KR); Hyoeun Kim, Seoul (KR); Hyejeong Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 876 days.

This patent is subject to a terminal disclaimer.

(21) Appl. No.: 16/597,364

(22) Filed: Oct. 9, 2019

(65) Prior Publication Data

US 2020/0041159 A1    Feb. 6, 2020

(30) Foreign Application Priority Data

Aug. 21, 2019  (KR) .................... 10-2019-0102683

(51) Int. Cl.
| | |
|---|---|
| *F24F 11/49* | (2018.01) |
| *F24F 11/56* | (2018.01) |
| *F24F 11/64* | (2018.01) |
| *F24F 11/80* | (2018.01) |
| *G05B 13/04* | (2006.01) |

(Continued)

(52) U.S. Cl.
CPC .............. *F24F 11/49* (2018.01); *F24F 11/56* (2018.01); *F24F 11/64* (2018.01); *F24F 11/80* (2018.01); *G05B 13/027* (2013.01); *G05B 13/041* (2013.01); *F24F 2110/10* (2018.01); *F24F 2110/12* (2018.01); *F24F 2110/20* (2018.01);

(Continued)

(58) Field of Classification Search
CPC .. F24F 11/49; F24F 11/80; F24F 11/64; F24F 11/56; F24F 2110/10; F24F 2110/12; F24F 2110/20; F24F 2110/50; F24F 40/00; F24F 2221/00
USPC ......................................................... 706/15
See application file for complete search history.

(56) References Cited

U.S. PATENT DOCUMENTS

| | | | |
|---|---|---|---|
| 2012/0130547 A1* | 5/2012 | Fadell ................. | F24F 11/0012 700/276 |
| 2017/0234562 A1* | 8/2017 | Ribbich ............. | G05D 23/1934 700/277 |

(Continued)

*Primary Examiner* — Md Azad
(74) *Attorney, Agent, or Firm* — Fish & Richardson P.C.

(57) ABSTRACT

Provided is an artificial intelligence air conditioner for calibrating sensor data. The artificial intelligence air conditioner includes a sensor unit configured to acquire sensor data; a communication unit configured to receive at least one of external sensor data or environment information from at least one of an external air conditioner or an internet of things (IoT) device; and a processor. The processor is configured to generate estimated sensor data corresponding to the sensor unit using a sensor data estimation model, the received external sensor data and the received environment information, determine whether the acquired sensor data is abnormal using the generated estimated sensor data, perform an air conditioning function using the acquired sensor data if the acquired sensor data is determined as normal, and perform the air conditioning function using the generated estimated sensor data if the acquired sensor data is determined as abnormal.

19 Claims, 13 Drawing Sheets

(51) Int. Cl.
  *G05B 13/02*   (2006.01)
  *F24F 110/10*  (2018.01)
  *F24F 110/12*  (2018.01)
  *F24F 110/20*  (2018.01)
  *F24F 110/50*  (2018.01)
  *F24F 140/00*  (2018.01)

(52) U.S. Cl.
  CPC ....... *F24F 2110/50* (2018.01); *F24F 2140/00* (2018.01); *F24F 2221/00* (2013.01)

(56) References Cited

U.S. PATENT DOCUMENTS

| | | | |
|---|---|---|---|
| 2018/0197311 A1* | 7/2018 | Takizawa | G06T 7/80 |
| 2018/0314914 A1* | 11/2018 | Kuriyama | G05B 23/024 |
| 2019/0178514 A1* | 6/2019 | Sasaki | F24F 11/56 |
| 2020/0126549 A1* | 4/2020 | Tei | F24F 11/38 |
| 2020/0240662 A1* | 7/2020 | Picardi | G06N 3/08 |

* cited by examiner

ARTIFICIAL INTELLIGENCE AIR CONDITIONER AND METHOD FOR CALIBRATING SENSOR DATA OF AIR CONDITIONER

CROSS-REFERENCE TO RELATED APPLICATIONS

The present application claims priority under 35 U.S.C. 119 and 35 U.S.C. 365 to Korean Patent Application No. 10-2019-0102683 filed on Aug. 21, 2019, which is hereby incorporated by reference in its entirety.

BACKGROUND

The present disclosure relates to an artificial air conditioner and a method for calibrating sensor data of the air conditioner. Specifically, the present disclosure relates to an artificial air conditioner and a method for calibrating sensor data of an air conditioner using external sensor data or environmental data.

Air conditioners (or air controllers) are essential equipment in modern buildings, and a plurality of air conditioners are installed in a single space. A temperature sensor and a humidity sensor included in the air conditioner are important parts for operating the air conditioner. If the temperature sensor or the humidity sensor does not operate normally, the air conditioner cannot be expected to operate normally.

However, in general, it is difficult for a user to determine whether the sensors included in the air conditioner operate normally, and when the sensors do not operate normally, the air conditioner cannot be used normally.

SUMMARY

Embodiments provide an artificial air conditioner and a method, capable of automatically determining whether a sensor included in a specific air conditioner normally operates by using sensor data collected by at least one of the air conditioner or an Internet of things device.

Embodiments also provide an artificial air conditioner and a method, capable of calibrating sensor data corresponding to an abnormal sensor by using sensor data collected from at least one of another air conditioner or an Internet of things device when the sensor does not operate normally.

In one embodiment, a sensor unit acquires sensor data, external sensor data or environment information is received from an external air conditioner or an IoT device, and estimated sensor data corresponding to the sensor unit are generated by using received external sensor data and received environment information, abnormality of the acquired sensor data is determined by comparing the generated estimated sensor data with the acquired sensor data, the air conditioning function is performed by using the acquired sensor data when the acquired sensor data is normal, and the air conditioning function is performed by using the generated estimated sensor data when the acquired sensor data is abnormal.

In another embodiment, an alarm is provided to notify that abnormal sensor data has been generated when the acquired sensor data is determined as abnormal.

DETAILED DESCRIPTION OF THE EMBODIMENTS

Figure 1:
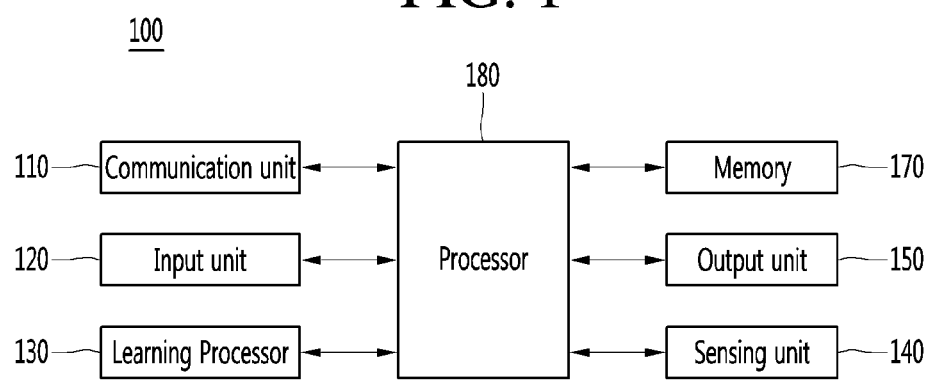
FIG. 1 is a block diagram illustrating an AI apparatus according to an embodiment.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the invention in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

Here, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 is a block diagram illustrating an AI apparatus 100 according to an embodiment of the present invention.

Hereinafter, the AI apparatus 100 may be referred to as a terminal.

The AI apparatus (or an AI device) 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI apparatus 100 may include a communication unit 110, an input unit 120, a learning processor 130, a sensor unit 140, an output unit 150, a memory 170, and a processor 180.

The communication unit 110 may transmit and receive data to and from external devices such as other AI apparatuses 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input unit 120 may acquire various kinds of data.

Here, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a training data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

Here, the learning processor 130 may perform AI processing together with the learning processor 240 of the AI server 200.

Here, the learning processor 130 may include a memory integrated or implemented in the AI apparatus 100. Alternatively, the learning processor 130 may be implemented by using the memory 170, an external memory directly connected to the AI apparatus 100, or a memory held in an external device.

The sensor unit 140 may acquire at least one of internal information about the AI apparatus 100, ambient environment information about the AI apparatus 100, and user information by using various sensors.

Examples of the sensors included in the sensor unit 140 may include a proximity sensor, an illuminance sensor, an acceleration sensor, a magnetic sensor, a gyro sensor, an inertial sensor, a red-green-blue (RGB) sensor, an infrared (IR) sensor, a fingerprint recognition sensor, an ultrasonic sensor, an optical sensor, a microphone, a light detection and ranging (lidar), and a radio detection and ranging (radar).

The output unit 150 may generate an output related to a visual sense, an auditory sense, or a haptic sense.

Here, the output unit 150 may include a display unit for outputting time information, a speaker for outputting auditory information, and a haptic module for outputting haptic information.

The memory 170 may store data that supports various functions of the AI apparatus 100. For example, the memory 170 may store input data acquired by the input unit 120, training data, a learning model, a learning history, and the like.

The processor 180 may determine at least one executable operation of the AI apparatus 100 based on information determined or generated by using a data analysis algorithm or a machine learning algorithm. The processor 180 may control the components of the AI apparatus 100 to execute the determined operation.

To this end, the processor 180 may request, search, receive, or utilize data of the learning processor 130 or the memory 170. The processor 180 may control the components of the AI apparatus 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI apparatus 100 so as to drive an application program stored in memory 170. Furthermore, the processor 180 may operate two or more of the components included in the AI apparatus 100 in combination so as to drive the application program.

Figure 2:
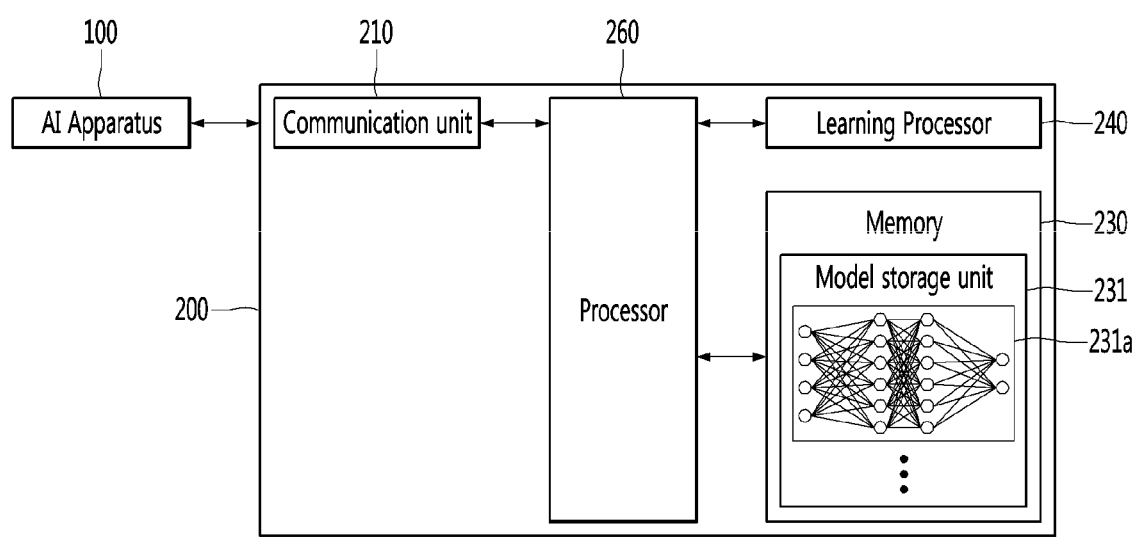
FIG. 2 is a block diagram illustrating an AI server according to an embodiment.

FIG. 2 is a block diagram illustrating an AI server 200 according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. Here, the AI server 200 may be included as a partial configuration of the AI apparatus 100, and may perform at least part of the AI processing together.

The AI server 200 may include a communication unit 210, a memory 230, a learning processor 240, a processor 260, and the like.

The communication unit 210 can transmit and receive data to and from an external device such as the AI apparatus 100.

The memory 230 may include a model storage unit 231. The model storage unit 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI apparatus 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
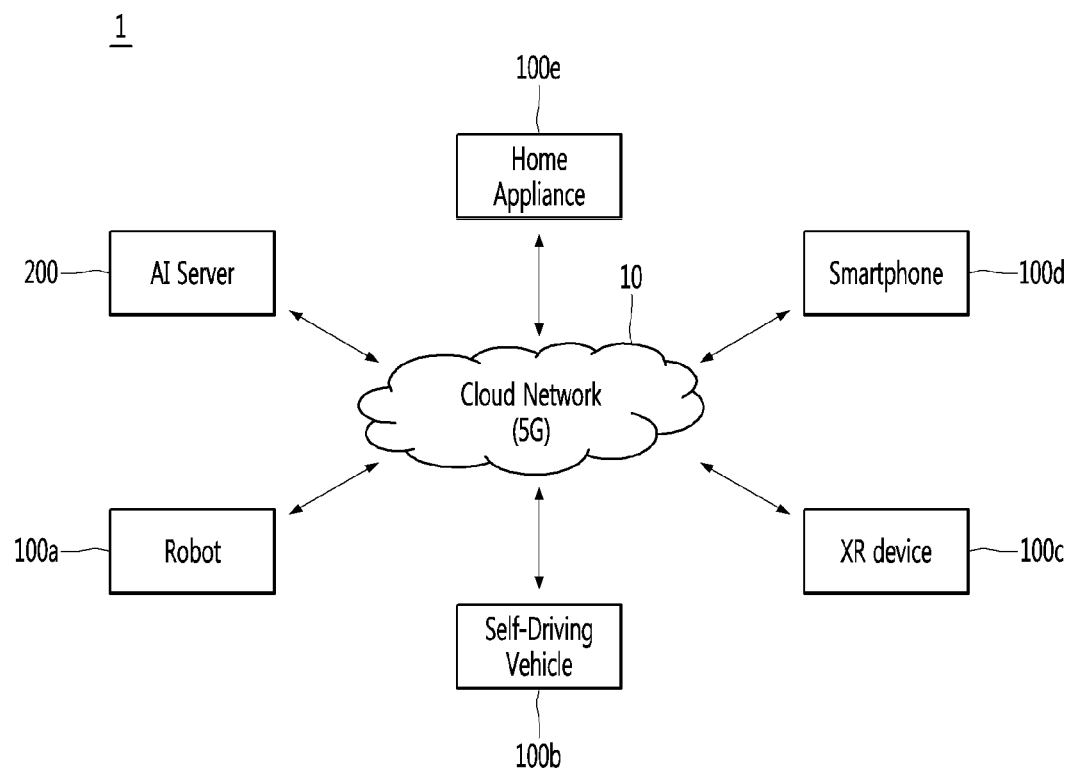
FIG. 3 is a view illustrating an AI system according to an embodiment.

FIG. 3 is a view illustrating an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI apparatuses 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI apparatuses constituting the AI system 1, that is, the robot 100a, the self-driving vehicle 100b, the XR device 100c, the smartphone 100d, or the home appliance 100e through the cloud network 10, and may assist at least part of AI processing of the connected AI apparatuses 100a to 100e.

Here, the AI server 200 may learn the artificial neural network according to the machine learning algorithm instead of the AI apparatuses 100a to 100e, and may directly store the learning model or transmit the learning model to the AI apparatuses 100a to 100e.

Here, the AI server 200 may receive input data from the AI apparatuses 100a to 100e, may infer the result value for the received input data by using the learning model, may generate a response or a control command based on the inferred result value, and may transmit the response or the control command to the AI apparatuses 100a to 100e.

Alternatively, the AI apparatuses 100a to 100e may infer the result value for the input data by directly using the learning model, and may generate the response or the control command based on the inference result.

Hereinafter, various embodiments of the AI apparatuses 100a to 100e to which the above-described technology is applied will be described. The AI apparatuses 100a to 100e illustrated in FIG. 3 may be regarded as a specific embodiment of the AI apparatus 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

Here, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external device to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. Here, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100b may recognize the environment or objects for an area covered by a field of view or an area over a certain distance by receiving the sensor information from external devices, or may receive directly recognized information from the external devices.

The self-driving vehicle 100b may perform the above-described operations by using the learning model composed of at least one artificial neural network. For example, the self-driving vehicle 100b may recognize the surrounding environment and the objects by using the learning model, and may determine the traveling route by using the recognized surrounding information or object information. The learning model may be learned directly from the self-driving vehicle 100a or may be learned from an external device such as the AI server 200.

Here, the self-driving vehicle 100b may perform the operation by generating the result by directly using the learning model, but the sensor information may be transmitted to the external device such as the AI server 200 and the generated result may be received to perform the operation.

The self-driving vehicle 100b may use at least one of the map data, the object information detected from the sensor information, or the object information acquired from the external device to determine the travel route and the travel plan, and may control the driving unit such that the self-driving vehicle 100b travels along the determined travel route and travel plan.

The map data may include object identification information about various objects arranged in the space (for example, road) in which the self-driving vehicle 100b travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100b may perform the operation or travel by controlling the driving unit based on the control/interaction of the user. Here, the self-driving vehicle 100b may acquire the intention information of the interaction due to the user's operation or speech utterance, and may determine the response based on the acquired intention information, and may perform the operation.

<AI+XR>

The XR device 100c, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100c may analyzes three-dimensional point cloud data or image data acquired from various sensors or the external devices, generate position data and attribute data for the three-dimensional points, acquire information about the surrounding space or the real object, and render to output the XR object to be output. For example, the XR device 100c may output an XR object including the additional information about the recognized object in correspondence to the recognized object.

The XR device 100c may perform the above-described operations by using the learning model composed of at least one artificial neural network. For example, the XR device 100c may recognize the real object from the three-dimensional point cloud data or the image data by using the learning model, and may provide information corresponding to the recognized real object. The learning model may be directly learned from the XR device 100c, or may be learned from the external device such as the AI server 200.

Here, the XR device 100c may perform the operation by generating the result by directly using the learning model, but the sensor information may be transmitted to the external device such as the AI server 200 and the generated result may be received to perform the operation.

<AI+Robot+Self-Driving>

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given route without the user's control or moves for itself by determining the route by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

Here, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

Here, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Figure 4:
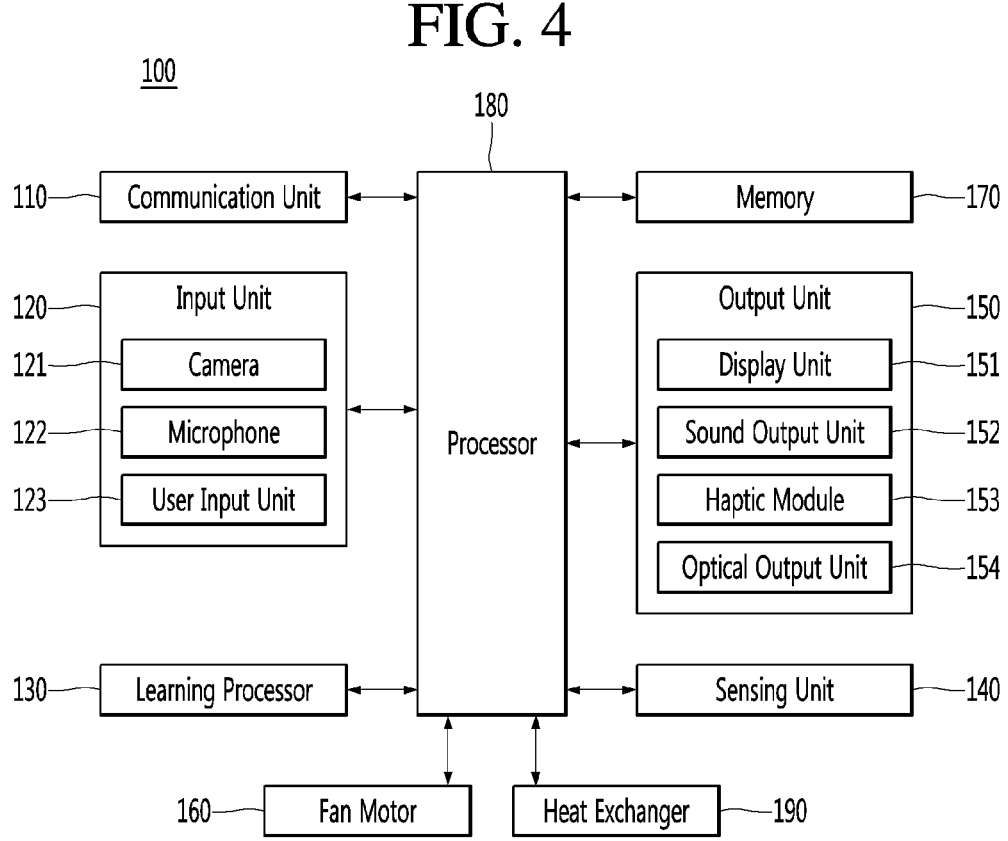
FIG. 4 is a block diagram illustrating an AI apparatus according to an embodiment.

FIG. 4 is a block diagram illustrating an AI apparatus 100 according to an embodiment of the present invention.

The redundant repeat of FIG. 1 will be omitted below.

An artificial intelligence device may refer to an artificial intelligence air conditioner, and may be called an artificial intelligence air conditioner. Therefore, unless otherwise specified, the artificial intelligence device and the artificial intelligence air conditioner may be used in the same sense.

Referring to FIG. 4, the artificial intelligence device 100 may further include a fan motor 160 and a heat exchanger 190.

The input unit 120 may include a camera 121 for image signal input, a microphone 122 for receiving audio signal input, and a user input unit 123 for receiving information from a user.

Voice data or image data collected by the input unit 120 are analyzed and processed as a user's control command.

Then, the input unit 120 is used for inputting image information (or signal), audio information (or signal), data, or information inputted from a user and the AI apparatus 100 may include at least one camera 121 in order for inputting image information.

The camera 121 processes image frames such as a still image or a video acquired by an image sensor in a video call mode or a capturing mode. The processed image frame may be displayed on the display unit 151 or stored in the memory 170.

The microphone 122 processes external sound signals as electrical voice data. The processed voice data may be utilized variously according to a function (or an application program being executed) being performed in the AI apparatus 100. Moreover, various noise canceling algorithms for removing noise occurring during the reception of external sound signals may be implemented in the microphone 122.

The user input unit 123 is to receive information from a user and when information is inputted through the user input unit 123, the processor 180 may control an operation of the AI apparatus 100 to correspond to the inputted information.

The user input unit 123 may include a mechanical input means (or a mechanical key, for example, a button, a dome switch, a jog wheel, and a jog switch at the front, back or side of the AI apparatus 100) and a touch type input means. As one example, a touch type input means may include a virtual key, a soft key, or a visual key, which is displayed on a touch screen through software processing or may include a touch key disposed at a portion other than the touch screen.

The sensor unit 140 may also be referred to as a sensor unit.

The sensor unit 140 may include at least one of a temperature sensor configured to measure an ambient temperature or a humidity sensor configured to measure an ambient humidity.

The output unit 150 may include at least one of a display unit 151, a sound output module 152, a haptic module 153, or an optical output module 154.

The display unit 151 may display (output) information processed in the AI apparatus 100. For example, the display unit 151 may display execution screen information of an application program running on the AI apparatus 100 or user interface (UI) and graphic user interface (GUI) information according to such execution screen information.

The display unit 151 may be formed with a mutual layer structure with a touch sensor or formed integrally, so that a touch screen may be implemented. Such a touch screen may serve as the user input unit 123 providing an input interface between the AI apparatus 100 and a user, and an output interface between the AI apparatus 100 and a user at the same time.

The sound output module 152 may output audio data received from the wireless communication unit 110 or stored in the memory 170 in a call signal reception or call mode, a recording mode, a voice recognition mode, or a broadcast reception mode.

The sound output module 152 may include a receiver, a speaker, and a buzzer.

The haptic module 153 generates various haptic effects that a user can feel. A representative example of a haptic effect that the haptic module 153 generates is vibration.

The optical output module 154 outputs a signal for notifying event occurrence by using light of a light source of the AI apparatus 100. An example of an event occurring in the AI apparatus 100 includes message reception, call signal reception, missed calls, alarm, schedule notification, e-mail reception, and information reception through an application.

The fan motor 160 may rotate an internal fan to suck air from the outside of the artificial intelligence device or the artificial air conditioner into the interior. In addition, the fan motor 160 may allow the air sucked into the interior to flow to the heat exchanger 190. The air passing through the heat exchanger 190 may be discharged to the outside.

The heat exchanger 190 may change the temperature or humidity of the air introduced thereinto.

Figure 5:
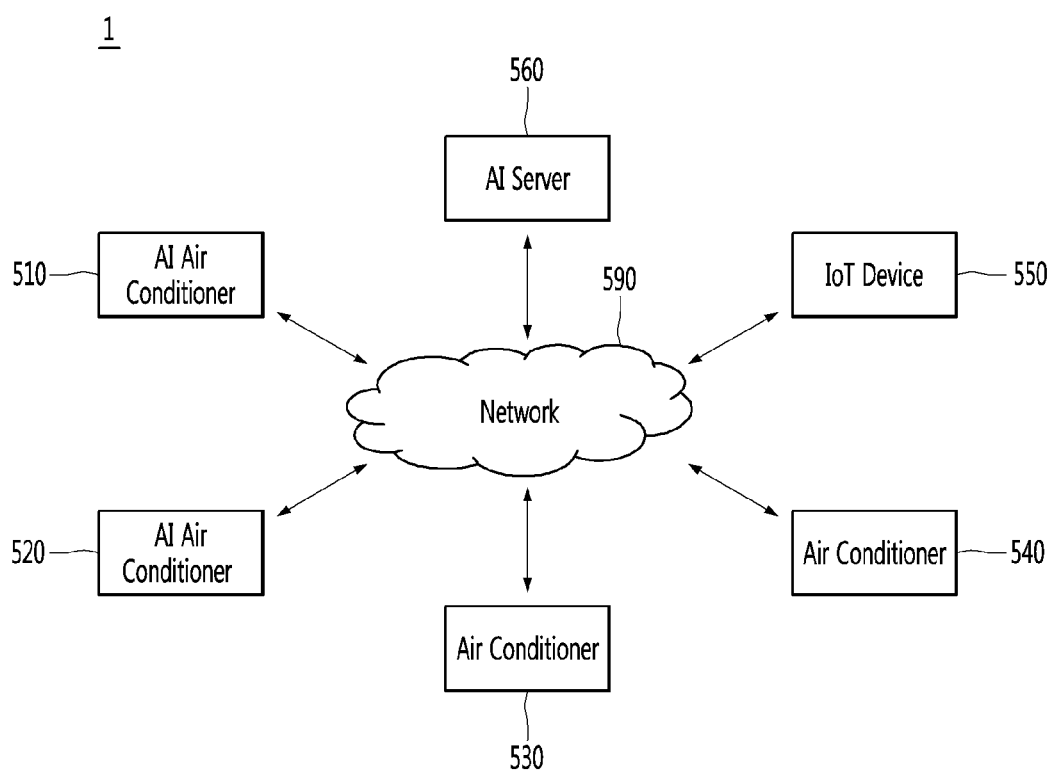
FIG. 5 is a view illustrating an AI system according to an embodiment.

FIG. 5 is a view illustrating an artificial intelligence (AI) system 1 according to an embodiment of the present invention.

Referring to FIG. 5, the artificial intelligence system 1 may include at least one of artificial intelligence air conditioners 510 and 520, air conditioners 530 and 540, an IoT device 550, or an artificial intelligence server 560.

The artificial intelligence system 1 essentially includes at least one of the artificial intelligence air conditioners 510 and 520 or the artificial intelligence server 560, and the artificial intelligence air conditioners 510 and 520 or the artificial intelligence server 560 included in the artificial intelligence system 1 may perform a task of calibrating sensor data of the air conditioner.

Although FIG. 5 shows the artificial intelligence server 560 included in the artificial intelligence system 1, the present disclosure is not limited thereto. That is, the artificial intelligence system 1 may include only the artificial intelligence air conditioners 510 and 520 or the air conditioners 530 and 540 without the artificial intelligence server 560.

When the artificial intelligence server 560 calibrates sensor data of the air conditioner, the sensor data to be calibrated may be sensor data of the artificial air conditioners 510 and 520 or the air conditioners 530 and 540 included in the same artificial intelligence system 1. In contrast, when the artificial intelligence air conditioners 510 and 520 calibrate the sensor data of the air conditioner, the sensor data to be calibrated may be sensor data of the artificial intelligence air conditioners 510 and 520.

Each of the artificial air conditioners 510 and 520, the air conditioners 530 and 540, the IoT device 550, and the artificial intelligence server 560 may communicate with each other via a network 590. The devices 510 to 560 may communicate with each other through a base station, a router, or the like, but may also directly communicate with each other using a short range communication technology. For example, the devices 510 to 560 may communicate with each other via a base station or may directly communicate with each other by using 5G (5th generation) communication.

The IoT device 550 may include at least one sensor to generate sensor data or environment information, and may transmit the generated sensor data or environment information to the artificial intelligence air conditioners 510 and 520 or the artificial intelligence server 560. In addition, the artificial intelligence air conditioners 510 and 520 or the artificial intelligence server 560 may calibrate the sensor data of the air conditioners 510 to 540 by using the sensor data or environment information received from the IoT device 550. For example, the IoT device 550 may include a temperature sensor to generate temperature sensor data and to transmit the generated temperature sensor data to the artificial intelligence air conditioners 510 and 520 or the artificial intelligence server 560.

Figure 6:
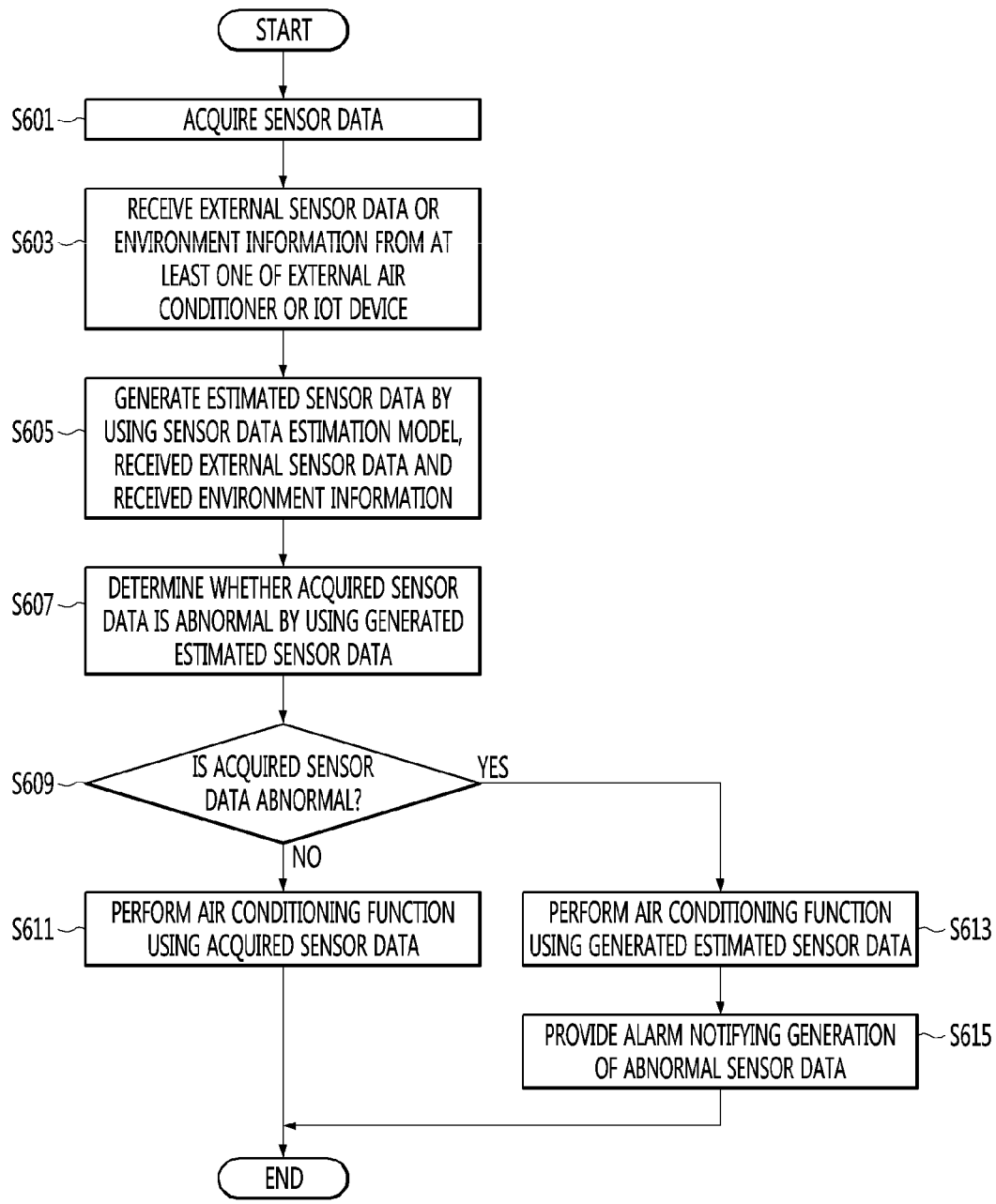
FIG. 6 is a flowchart illustrating a method of calibrating sensor data of an air conditioner according to an embodiment.

FIG. 6 is a flowchart illustrating a method of calibrating sensor data of an air conditioner according to an embodiment.

Specifically, FIG. 6 illustrates an embodiment in which the artificial intelligence air conditioner 100 included in the artificial intelligence system 1 calibrate the sensor data thereof.

Referring to FIG. 6, the processor 180 of the artificial intelligence air conditioner 100 acquires sensor data through the sensor unit 140 (S601).

The sensor unit 140 may include at least one of a temperature sensor or a humidity sensor, and the processor 180 may acquire at least one of temperature sensor data and humidity sensor data through the sensor unit 140.

In addition, the processor 180 of the artificial intelligence air conditioner 100 receives at least one of external sensor data or environment information from at least one of an external air conditioner or an IoT device through the communication unit 110 (S603).

The external air conditioner refers to an air conditioner other than an artificial intelligence air conditioner 100 calibrating the sensor data of the air conditioner. The external air conditioner may refer to both an artificial air conditioner equipped with an artificial intelligence as well as a general air conditioner not equipped with an artificial intelligence.

The external sensor data may refer to sensor data acquired from an external air conditioner or an IoT device, other than sensor data acquired from the artificial intelligence air conditioner 100 that calibrates sensor data of the air conditioner. For example, the external sensor data may include temperature sensor data, humidity sensor data, image sensor data, and the like.

The image sensor data may refer to image data acquired through a camera. The image sensor data may include at least one of RGB sensor data, infrared sensor data, or depth sensor data. The processor 180 may determine the number of persons, opening/closing state of a window, etc. by using the acquired image sensor data.

The environment information may refer to information on the surrounding environment that is not directly acquired by the sensor unit of the external air conditioner or the sensor unit of the IoT device, and may refer to information received from an external server or external devices. For example, the environment information may include temperature information, humidity information, weather information, and the like received from the weather server.

In addition, the processor 180 of the artificial intelligence air conditioner 100 may generate estimated sensor data by using a sensor data estimation model, the received external sensor data, and the received environment information (S605).

The sensor data estimation model may include an artificial neural network and may be learned using a machine learning algorithm or a deep learning algorithm. Here, the sensor data estimation model including an artificial neural network signifies that at least a part of the sensor data estimation model is configured as an artificial neural network. For example, the sensor data estimation model may be an auto encoder.

The first sensor data estimation model may refer to a model that outputs a sensor value expected to be acquired by the target sensor when the received external sensor data and the received environment information are input thereto. Specifically, when an input feature vector is extracted from the received external sensor data and the received environment information, and when the extracted input feature vector is input to the first sensor data estimation model, the first sensor data estimation model may output at least one estimated sensor value.

The second sensor data estimation model may refer to a model that outputs a sensor value expected to be acquired by the target sensor when the received external sensor data, the received environment information, and the acquired sensor data are input thereto. Specifically, when the input feature vector is extracted from the received external sensor data, the received environment information, and the acquired sensor data, and when the extracted input feature vector is input to the second sensor data estimation model, the sensor data estimation model may output at least one estimated sensor value.

The first sensor data estimation model or the second sensor data estimation model may be learned in the learning processor 130 or may be learned in the learning processor 240 of the artificial intelligence server 200.

The processor 180 may use the above-described first sensor data estimation model in a situation where a sensor included in the sensor unit 140 fails to acquire sensor data or the sensor data is empty. When the sensor unit 140 does not acquire sensor data, it may be regarded to acquire null sensor data. In addition, the processor 180 may use the above-described first sensor data estimation model or the above-described second sensor data estimation model in a situation in which the sensor data may be acquired.

The processor 180 may acquire an estimated sensor value corresponding to the sensor included in the sensor unit 140 by using the first sensor data estimation model or the second sensor data estimation model. In addition, the processor 180 may generate estimated sensor data by using the acquired estimated sensor values.

That is, the processor 180 may acquire information such as temperature sensor data, humidity sensor data, a number of persons, an opening/closing state of a window, etc., which are collected from an external device, from the received external sensor data or the received environment information, and may generate the estimated sensor data from the information acquired by using the first sensor data estimation model or the second sensor data estimation model.

In addition, the processor 180 of the artificial intelligence air conditioner 100 may determine whether the acquired sensor data is abnormal by using the generated estimated sensor data (S607).

The processor 180 may determine whether the acquired sensor data is abnormal by comparing the generated estimated sensor data with the acquired sensor data. In detail, the processor 180 may compare a sensor value included in the generated estimated sensor data with an acquired sensor value or a measured sensor value corresponding to the sensor value in order to determine whether the acquired sensor data is abnormal.

The processor 180 may determine whether each sensor is abnormal by comparing the estimated sensor value with the acquired sensor value for each sensor. Therefore, when a plurality of sensor values are included in the acquired sensor data, the processor 180 may individually determine whether the plurality of sensors are abnormal.

The processor 180 may calculate a difference between the estimated sensor value and the acquired sensor value for each sensor, and compare the calculated difference with a first reference value, which is set for each sensor, to determine whether the acquired sensor data is abnormal.

For example, when the first reference value for the temperature sensor is 5° C., the estimated temperature sensor value is 25° C., and the measured temperature sensor value is 23° C., the processor 180 may determine that the acquired temperature sensor value is normal since a difference between the estimated temperature sensor value and the acquired temperature sensor value is smaller than the first reference value of 5° C. In contrast, when the first reference value for the temperature sensor is 5° C., the estimated temperature sensor value is 25° C., and the measured temperature sensor value is 19° C., the processor 180 may determine that the acquired temperature sensor value is abnormal since the difference between the estimated temperature sensor value and the acquired temperature sensor value is greater than the first reference value of 5° C.

Alternatively, the processor 180 may calculate a difference between the estimated sensor value and the acquired sensor value for each sensor, calculate a ratio of the calculated difference to the estimated sensor value, and compare the calculated ratio with a second reference value, which is set for each sensor, to determine whether the acquired sensor data is abnormal.

For example, when the second reference value for the temperature sensor is 0.15, the estimated temperature sensor value is 25° C., and the measured temperature sensor value is 23° C., the processor 180 may determine that the acquired temperature sensor value is normal since the ratio of the difference (2° C.) between the estimated temperature sensor value and the acquired temperature sensor value to the estimated temperature sensor value (0.08=2/25) is smaller than the second reference value of 0.15. In contrast, when the second reference value for the temperature sensor is 0.15, the estimated temperature sensor value is 25° C., and the measured temperature sensor value is 19° C., the processor 180 may determine that the acquired temperature sensor value is abnormal since the ratio of the difference (6° C.) between the estimated temperature sensor value and the acquired temperature sensor value to the estimated temperature sensor value (0.24=6/25) is greater than the second reference value of 0.15.

The reference values used to determine the acquired sensor data as abnormal may be manually set by the user.

In addition, the processor 180 of the artificial intelligence air conditioner 100 may determine whether the acquired sensor data is determined to be abnormal (S609).

If the acquired sensor data is not determined as abnormal in the step S609 (when the acquired sensor data is determined as normal), the processor 180 of the artificial intelligence air conditioner 100 performs the air conditioning function by using the acquired sensor data (S611).

Since the sensor data acquired by the sensor unit 140 of the artificial intelligence air conditioner 100 is determined as normal, the processor 180 performs the air conditioning function by using the sensor data acquired by the sensor unit 140.

For example, when the artificial intelligence air conditioner 100 operates to allow an ambient temperature to become a target temperature and the temperature sensor data acquired by the sensor unit 140 is determined as normal, the processor 180 may determine the operation of a heat exchanger 190 based on the acquired temperature sensor data.

Similarly, when the artificial air conditioner 100 operates to maintain an ambient humidity lower than a target humidity and the humidity sensor data acquired by the sensor unit 140 is determined as normal, the processor 180 may determine the operation of the heat exchanger 190 based on the acquired humidity sensor data.

If the acquired sensor data is determined to as abnormal in step S609, the processor 180 of the artificial intelligence air conditioner 100 may perform an air conditioning function by using the generated estimated sensor data (S613).

Since the sensor data acquired by the sensor unit 140 of the artificial intelligence air conditioner 100 is determined as abnormal, the processor 180 performs the air conditioning function by using the generated estimated sensor data without using the sensor data acquired by the sensor unit 140.

For example, when the artificial intelligence air conditioner 100 operates to allow an ambient temperature to become a target temperature and the temperature sensor data acquired by the sensor unit 140 is determined as abnormal, the processor 180 may determine the operation of the heat exchanger 190 based on the estimated temperature sensor data generated by using the sensor data estimation model without determining the operation of the heat exchanger 190 based on the acquired temperature sensor data.

Similarly, when the artificial air conditioner 100 operates to maintain an ambient humidity lower than a target humidity and the humidity sensor data acquired by the sensor unit 140 is determined as abnormal, the processor 180 may determine the operation of the heat exchanger 190 based on the estimated humidity sensor data generated by using the sensor data estimation model without determining the operation of the heat exchanger 190 based on the acquired humidity sensor data.

If a plurality of sensor values are included in the acquired sensor data, the processor 180 may perform the air conditioning function by using only the measured sensor value, which is determined as abnormal, as the estimated sensor value.

In addition, the processor 180 of the artificial intelligence air conditioner 100 may provide an alarm for notifying generation of abnormal sensor data (S615).

The processor 180 may transmit a control signal for outputting an alarm notifying the generation of abnormal sensor data to a user terminal, an administrator terminal, or an external artificial intelligence device through the communication unit 110. Alternatively, the processor 180 may output an alarm notifying the generation of abnormal sensor data through the output unit 150.

The external artificial intelligence device is an artificial intelligence device equipped with artificial intelligence, and may refer to a separate artificial intelligence device that is distinguished from the artificial intelligence air conditioner 100. For example, the external artificial intelligence device may include an artificial intelligence TV, an artificial intelligence speaker, an artificial intelligence robot, an artificial intelligence cleaner, and the like.

The alarm notifying the generation of abnormal sensor data may be provided as a visual alarm including a text or an image, a sound alarm including a sound, or a vibration alarm.

That is, the processor 180 may transmit control signals to a user terminal, an administrator terminal, or an external artificial intelligence device, such as a control signal to output the visual alarm for notifying the generation of abnormal sensor data, a control signal to output the sound alarm, and a control signal to output the vibration alarm.

Similarly, the processor 180 may output the visual alarm through a display unit 151 to notify the generation of the abnormal sensor data, output the sound alarm through an audio output unit 152 to notify the generation of the abnormal sensor data, and to output the vibration alarm through a haptic module 153 to notify the generation of the abnormal sensor data.

Further, when there is information about pre-registered service centers, the processor 180 may transmit an alarm to the service center to notify the generation of the abnormal sensor data through the communication unit 110 or may request repair or replacement of the abnormal sensor. In addition, the processor 180 may schedule a service for repair or replacement of the abnormal sensor at the service center.

Figure 7:
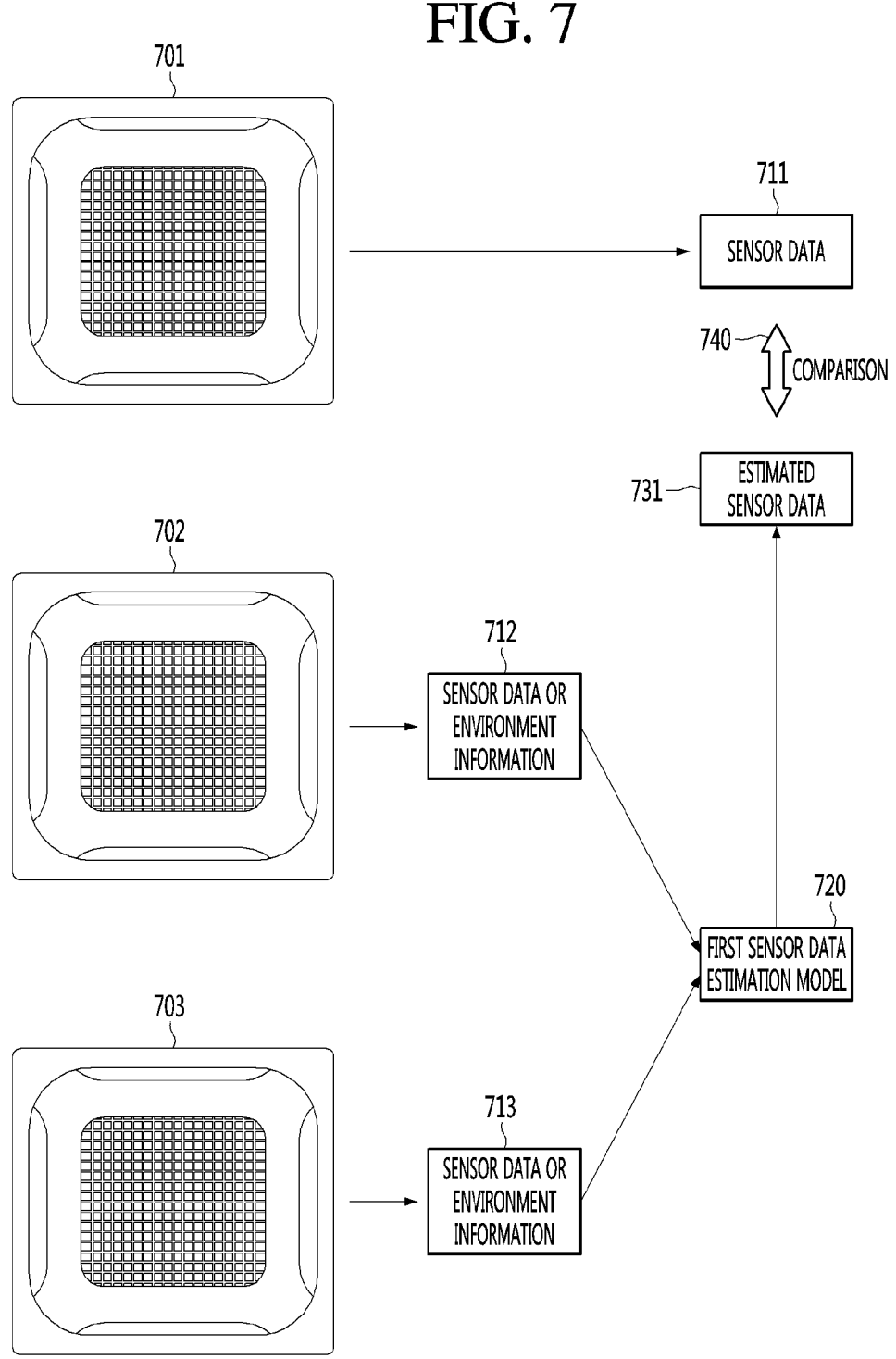
FIG. 7 is a view illustrating a method of calibrating sensor data of an air conditioner according to an embodiment.

FIG. 7 is a view illustrating a method of calibrating sensor data of an air conditioner according to an embodiment.

Referring to FIG. 7, the artificial intelligence system 1 may include a first air conditioner 701, a second air conditioner 702, and a third air conditioner 703, in which the first air conditioner 701 is assumed as a calibration target of the sensor data. The first air conditioner 701 may acquire sensor data 711, and the second air conditioner 702 and the third air conditioner 703 respectively acquire sensor data or environment information 712 and 713. The sensor data acquired by the second air conditioner 702 and the third air conditioner 703 may be referred to as external sensor data.

An input feature vector is extracted from sensor data or environment information 712 and 713 acquired from the second air conditioner 702 and the third air conditioner 703, and when the extracted input feature vector is input into a first sensor data estimation model 720, the estimated sensor data 731 for the first air conditioner 701 may be acquired.

In addition, the sensor data 711 acquired by the first air conditioner 701 is compared 740 with the sensor data 731 estimated from the sensor data or the environment information 712 and 713 acquired by other air conditioners 702 and 703, so that it is possible to determine whether the sensor data 711 acquired by the first air conditioner 701 is normal or abnormal.

If the sensor data 711 acquired by the first air conditioner 701 is determined as abnormal data, the first air conditioner 701 may perform the air conditioning function by using the estimated sensor data 731 instead of the directly acquired sensor data 711.

Figure 8:
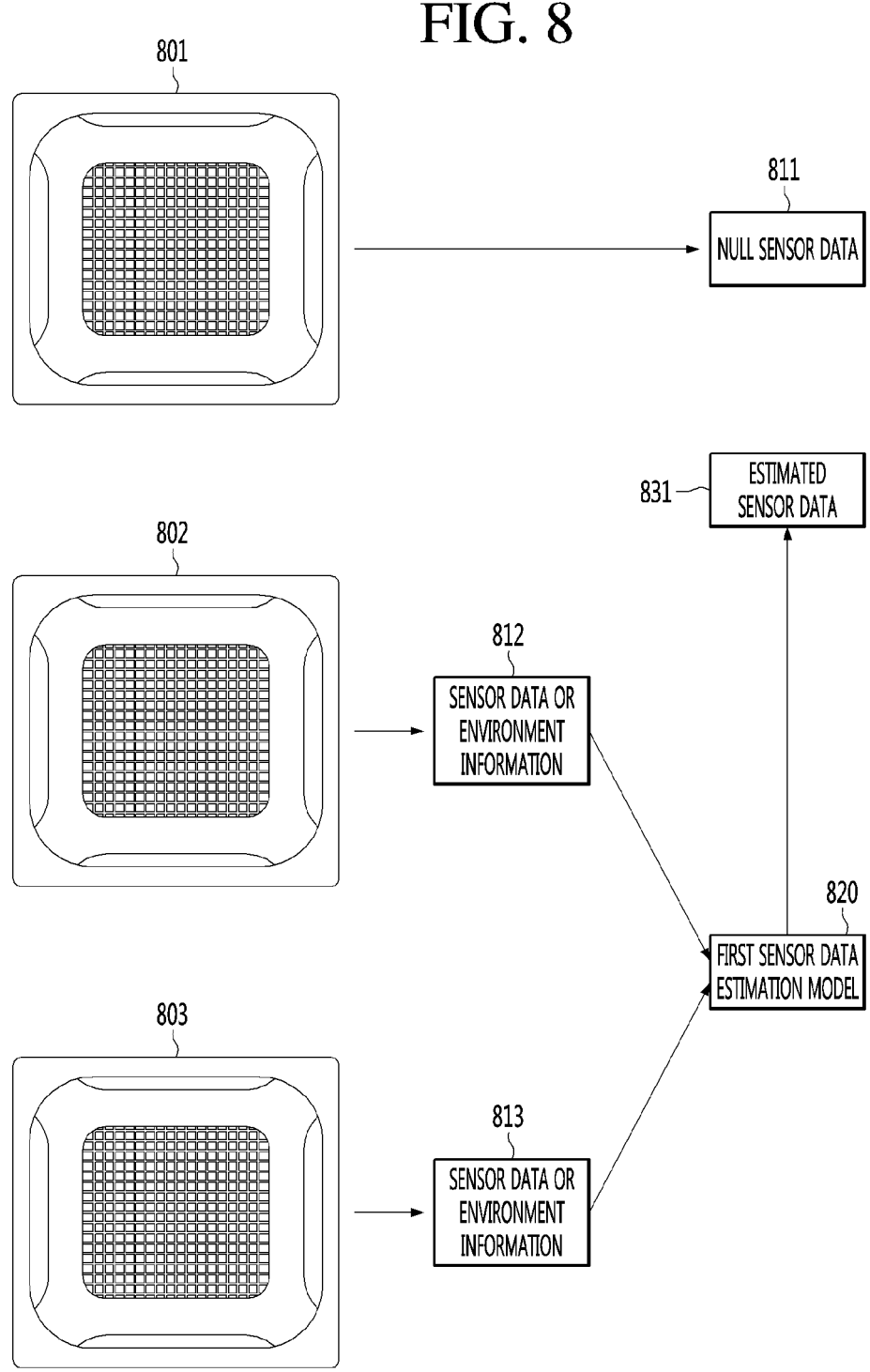
FIG. 8 is a view illustrating a method of calibrating sensor data of an air conditioner according to an embodiment.

FIG. 8 is a view illustrating a method of calibrating sensor data of an air conditioner according to an embodiment.

Referring to FIG. 8, the artificial intelligence system 1 may include a first air conditioner 801, a second air conditioner 802, and a third air conditioner 803, in which the first air conditioner 801 is assumed as a calibration target of the sensor data. Further, it is assumed that the first air conditioner 801 acquires null sensor data 811 due to a failure of a sensor of the first air conditioner 801. Each of the second air conditioner 802 and the third air conditioner 803 acquires sensor data or environment information 812 and 813. The sensor data acquired by the second air conditioner 802 and the third air conditioner 803 may be referred to as external sensor data.

An input feature vector is extracted from sensor data or environment information 812 and 813 acquired from the second air conditioner 802 and the third air conditioner 803, and when the extracted input feature vector is input into a first sensor data estimation model 820, the estimated sensor data 831 for the first air conditioner 801 may be acquired.

Since the sensor data acquired by the first air conditioner 801 is the null sensor data 811, the null sensor data 811 acquired by the first air conditioner 801 may be determined as abnormal without being compared with the estimated sensor data 831. Therefore, the first air conditioner 801 may perform the air conditioning function using the estimated sensor data 831 instead of the directly acquired sensor data 811.

Figure 9:
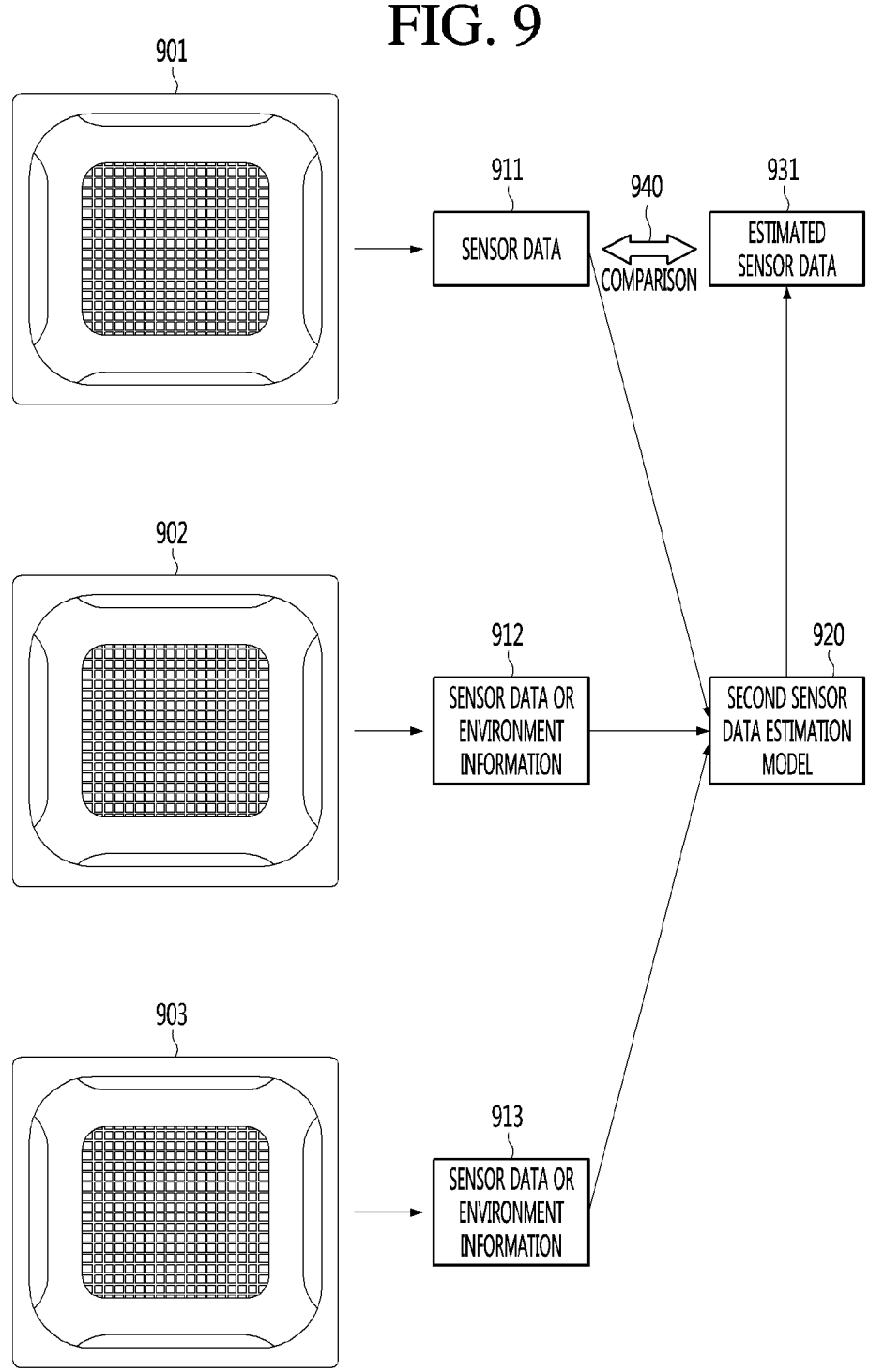
FIG. 9 is a view illustrating a method of calibrating sensor data of an air conditioner according to an embodiment of the present invention.

FIG. 9 is a view illustrating a method of calibrating sensor data of an air conditioner according to an embodiment.

Referring to FIG. 9, the artificial intelligence system 1 may include a first air conditioner 901, a second air conditioner 902, and a third air conditioner 903, in which the first air conditioner 901 is assumed as a calibration target of the sensor data. The first air conditioner 901 acquires sensor data 911, and each of the second air conditioner 902 and the third air conditioner 903 acquires sensor data or environment information 912 and 913. The sensor data acquired by the second air conditioner 902 and the third air conditioner 903 may be referred to as external sensor data.

An input feature vector is extracted from sensor data or environment information 911, 912, and 913 acquired from the respective air conditioners 901, 902, and 903, and when the extracted input feature vector is input into the second sensor data estimation model 920, the estimated sensor data 931 for the first air conditioner 901 may be acquired.

In addition, the sensor data 911 acquired by the first air conditioner 901 is compared with the sensor data 911 estimated from the sensor data or the environment information 911, 912, 913 acquired by the air conditioners 901, 902, and 903 included in the same artificial intelligence system 1, so that it is possible to determine whether the sensor data 911 acquired by the first air conditioner 901 is normal or abnormal.

If the sensor data 911 acquired by the first air conditioner 901 is determined as abnormal data, the first air conditioner 901 may perform the air conditioning function by using the estimated sensor data instead of the directly acquired sensor data 911.

In FIGS. 7 to 9, one estimation data is generated by using external sensor data acquired from a plurality of air conditioners or an IoT device together with the first sensor data estimation model or the second sensor data estimation model, but the present invention is not limited thereto. In another embodiment, the first sensor data estimation model or the second sensor data estimation model generates estimated sensor data from external sensor data or environment information acquired from one external air conditioner or an IoT device, and thus each external air conditioner or each IoT device may generate one estimated sensor data. This example will be described below in conjunction with FIGS. 10 and 11.

Figure 10:
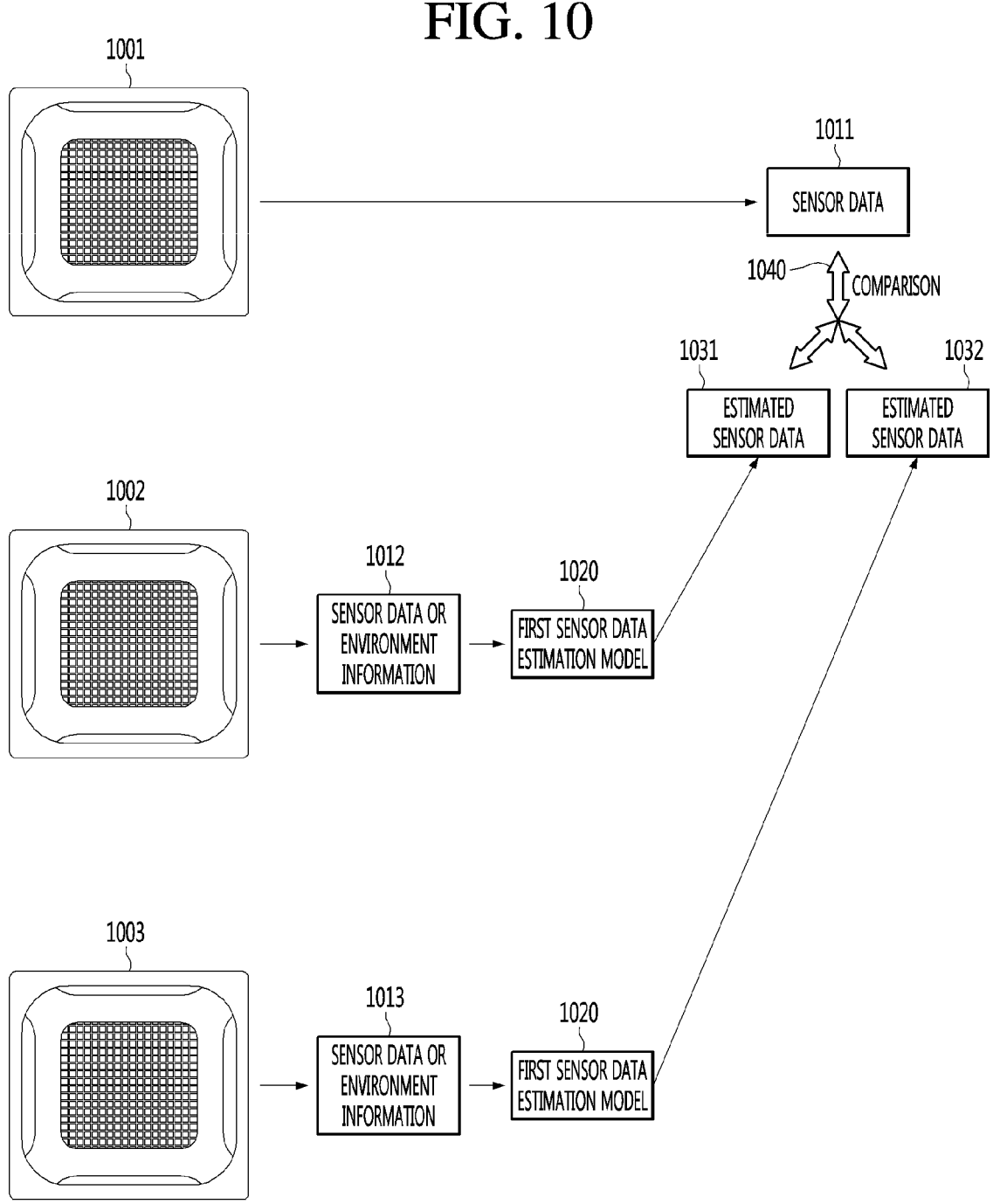
FIG. 10 is a view illustrating a method of calibrating sensor data of an air conditioner according to an embodiment.

FIG. 10 is a view illustrating a method of calibrating sensor data of an air conditioner according to an embodiment.

Referring to FIG. 10, the artificial intelligence system 1 includes a first air conditioner 1001, a second air conditioner 1002, and a third air conditioner 1003, in which the first air conditioner 1001 is assumed as a calibration target of the sensor data. The first air conditioner 1001 acquires sensor data 1011, and each of the second air conditioner 1002 and the third air conditioner 1003 acquires sensor data or environment information 1012 and 1013. The sensor data acquired by the second air conditioner 1002 and the third air conditioner 1003 may be referred to as external sensor data.

An input feature vector is extracted from the sensor data or the environment information 1012 acquired from the second air conditioner 1002, and when the extracted input feature vector is input to the first sensor data estimation model 1020, first estimated sensor data 1031 for the first air conditioner 1001 may be acquired. Similarly, when the input feature vector is extracted from the sensor data or the environment information 1013 acquired from the third air conditioner 1003, and when the extracted input feature vector is input to the first sensor data estimation model 1020, second estimated sensor data 1032 for the first air conditioner 1001 may be acquired.

Then, the sensor data 1011 acquired by the first air conditioner 1001 is compared with the first estimated sensor data 1031 and the second estimated sensor data 1032, so that it is possible to determine whether the sensor data 1011 acquired from the first air conditioner 1001 is normal or abnormal.

If the sensor data 1011 acquired by the first air conditioner 1001 is determined as abnormal data, the first air conditioner 1001 may perform the air conditioning function by using first estimated sensor data 1031 and the second estimated sensor data 1032 instead of directly acquired sensor data 1011. For example, the first air conditioner 1001 may perform the air conditioning function by using average data of the first estimated sensor data 1031 and the second estimated sensor data 1032.

Figure 11:
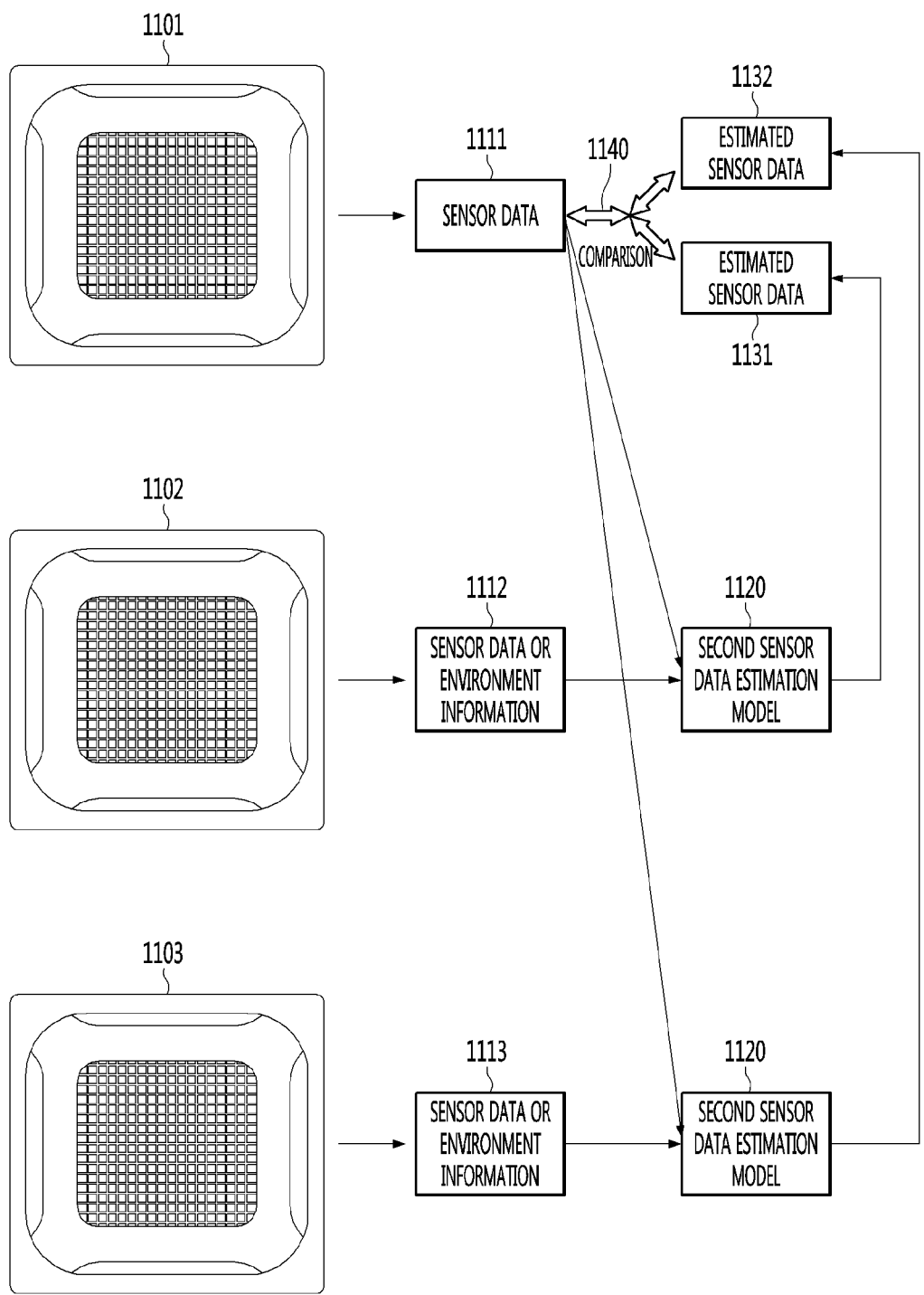
FIG. 11 is a view illustrating a method of calibrating sensor data of an air conditioner according to an embodiment.

FIG. 11 is a view illustrating a method of calibrating sensor data of an air conditioner according to an embodiment.

Referring to FIG. 11, the artificial intelligence system 1 may include a first air conditioner 1101, a second air conditioner 1102, and a third air conditioner 1103, in which the first air conditioner 1101 is assumed as a calibration target of the sensor data. The first air conditioner 1101 acquires sensor data 1111, and each of the second air conditioner 1102 and the third air conditioner 1103 acquires sensor data or environment information 1112 and 1113. The sensor data acquired by the second air conditioner 1102 and the third air conditioner 1103 may be referred to as external sensor data.

An input feature vector is extracted from the sensor data 1111 acquired from the first air conditioner 1101 and the sensor data or environment information 1112 acquired from the second air conditioner 1102, and when the extracted input feature vector is input to the second sensor data estimation model 1120, the first estimation sensor data 1131 for the first air conditioner 1101 may be acquired. Similarly, an input feature vector is extracted from the sensor data 1111 acquired from the first air conditioner 1101 and the sensor data or environment information 1113 acquired from the third air conditioner 1103, and when the extracted input feature vector is input to the second sensor data estimation model 1120, the second estimation sensor data 1132 for the first air conditioner 1101 may be acquired.

In addition, the sensor data 1111 acquired by the first air conditioner 1101 is compared 1140 with the first estimated sensor data 1131 and the second estimated sensor data 1132, so that it is possible to determine whether the sensor data 1111 acquired by the first air conditioner 1101 is normal or abnormal.

If the sensor data 1111 acquired by the first air conditioner 1101 is determined as abnormal data, the first air conditioner 1101 may perform the air conditioning function by using the first estimated sensor data 1131 and the second estimated sensor data 1132 instead of the directly acquired first acquired sensor data 1111. For example, the first air conditioner 1101 may perform the air conditioning function by using average data of the first estimated sensor data 1131 and the second estimated sensor data 1132.

Although only three air conditioners are shown in the artificial intelligence system 1 of FIGS. 7 to 11, the artificial intelligence system 1 may be configured with more air conditioners. If one artificial intelligence system is established with more air conditioners, it is possible to more accurately determine whether the sensor data is abnormal.

Figure 12:
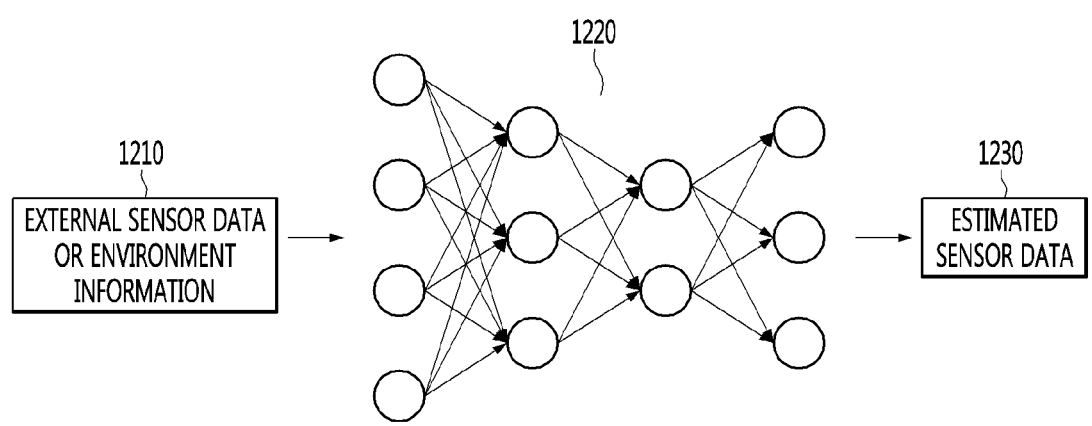
FIG. 12 is a view illustrating an example of a first sensor data estimation model according to an embodiment.

FIG. 12 is a view illustrating an example of a first sensor data estimation model according to an embodiment.

Referring to FIG. 12, the first sensor data estimation model 1220 may include an artificial neural network, which may be learned by using a machine learning algorithm or a deep learning algorithm.

When the input feature vector extracted from the external sensor data and environment information 1210 acquired by the external air conditioner or the IoT device is input to the first sensor data estimation model 1220, the first sensor data estimation model 1220 may output estimated sensor data 1230 for the target air conditioner.

The first sensor data estimation model 1220 is learned by using training data. The training data may include external sensor data and environment information acquired from an external air conditioner or an IoT device, and each of the external sensor data and environment information may be labeled with normal sensor data corresponding to a sensor unit of a corresponding target air conditioner.

In addition, the first sensor data estimation model 1220 may be learned to minimize a difference between the estimated sensor data 1230 to be output and the normal sensor data of the labeled target air conditioner for each training data. Accordingly, the first sensor data estimation model 1220 is learned to estimate sensor data as accurately as possible when the target air conditioner normally operates based on external sensor data and environment information 1210 acquired from an external air conditioner or an IoT device.

The structure of the artificial neural network constituting the first sensor data estimation model 1220 illustrated in FIG. 12 is one example only, and the structure of layers included in the artificial neural network, the number of layers, and the number of nodes included in each layer may not be limited thereto.

Figure 13:
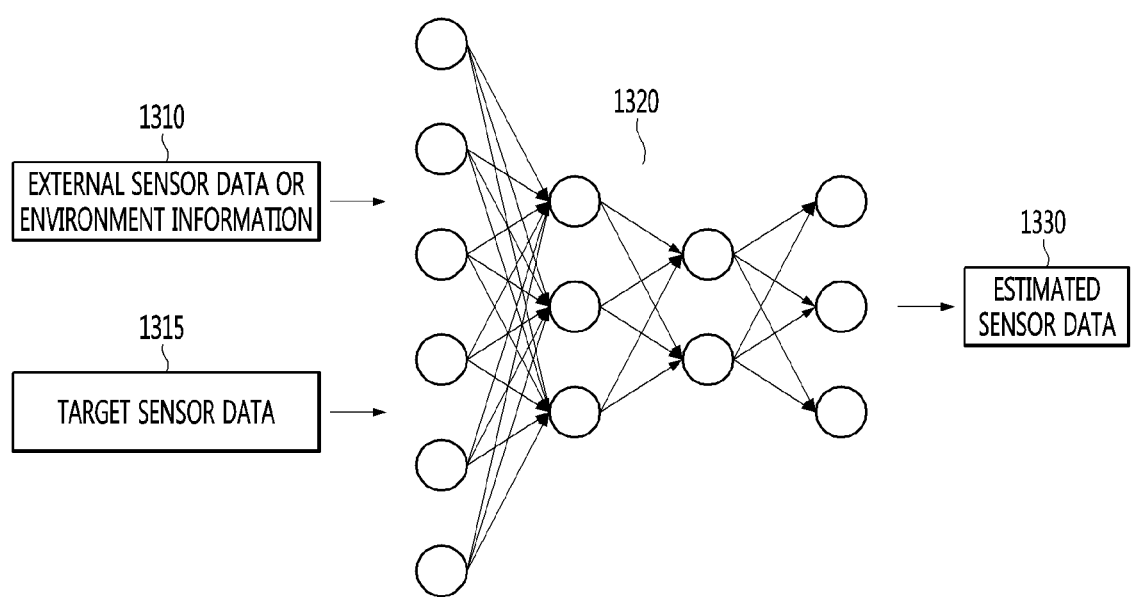
FIG. 13 is a view illustrating an example of a second sensor data estimation model according to an embodiment.

FIG. 13 is a view illustrating an example of a second sensor data estimation model according to an embodiment.

Referring to FIG. 13, the second sensor data estimation model 1320 may include an artificial neural network, which may be learned by using a machine learning algorithm or a deep learning algorithm.

When an input feature vector extracted from external sensor data and the environment information 1310 acquired from the external air conditioner or the IoT device and extracted from target sensor data 1315 acquired from the target air conditioner is input to the second sensor data estimation model 1320, the second sensor data estimation model 1320 may output estimated sensor data 1330 for the target air conditioner.

The second sensor data estimation model 1320 is learned by using the training data. The training data may include normal sensor data corresponding to the sensor unit of the target air conditioner, external sensor data and environment information acquired from an external air conditioner or an IoT device.

In addition, the second sensor data estimation model 1320 may be learned to minimize a difference between the estimated sensor data 1330 to be output and the normal sensor data for each training data. Therefore, the second sensor data estimation model 1320 is learned to estimate the sensor data as accurately as possible when the target air conditioner normally operates based on the external sensor data and the environment information 1310 acquired by the external air conditioner or the IoT device.

The structure of the artificial neural network constituting the second sensor data estimation model 1320 shown in FIG. 13 is one example only, and the structure of layers included in the artificial neural network, the number of layers, and the number of nodes included in each layer may not be limited thereto.

According to various embodiments, it is possible to automatically determine whether a problem occurs in a sensor included in an air conditioner, and a user can grasp information on the sensor having the problem and respond quickly.

According to various embodiments, even when normal sensor data cannot be collected due to a problem occurring in a sensor included in an air conditioner, sensor data can be calibrated by using sensor data collected from another air conditioner or an IoT device, so that the normal operation of the air conditioner can be expected.

According to an embodiment of the present invention, the above-described method may be implemented as a processor-readable code in a medium where a program is recorded. Examples of a processor-readable medium may include read-only memory (ROM), random access memory (RAM), CD-ROM, a magnetic tape, a floppy disk, and an optical data storage device.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An artificial intelligence air conditioner for calibrating sensor data, the artificial intelligence air conditioner comprising:
   a sensor unit configured to acquire sensor data;
   a communication unit configured to receive external sensor data and environment information from at least one of an external air conditioner or an internet of things (IoT) device; and
   a processor configured to:
      generate estimated sensor data corresponding to the sensor unit using at least one of (i) a first sensor data estimation model based on the received external sensor data and the received environment information or (ii) a second sensor data estimation model based on the acquired sensor data, the received external sensor data, and the received environment information;
      determine whether the acquired sensor data are abnormal using a result of comparing the generated estimated sensor data to the acquired sensor data;
      perform an air conditioning function using the acquired sensor data based on the acquired sensor data being determined to be normal; and
      perform the air conditioning function using the generated estimated sensor data based on the acquired sensor data being determined to be abnormal.

2. The artificial intelligence air conditioner according to claim 1, wherein the processor is configured to:
   calculate a difference between a value of the estimated sensor data and a value of the acquired sensor data; and determine that the acquired sensor data are abnormal based on the calculated difference exceeding a predetermined first reference value.

3. The artificial intelligence air conditioner according to claim 1, wherein the processor is configured to:
calculate a difference between a value of the estimated sensor data and a value of the acquired sensor data;
calculate a ratio of the calculated difference to the value of the estimated sensor data; and
determine that the acquired sensor data are abnormal based on the calculated difference exceeding a predetermined second reference value.

4. The artificial intelligence air conditioner according to claim 3, wherein the sensor unit includes at least one of a temperature sensor or a humidity sensor, and
the acquired sensor data includes at least one of temperature sensor data or humidity sensor data.

5. The artificial intelligence air conditioner according to claim 4, wherein the external sensor data includes at least one of temperature sensor data, humidity sensor data, or image sensor data acquired by a sensor unit of the external air conditioner or a sensor unit of the IoT device, and
the environment information includes at least one of ambient temperature information, ambient humidity information or weather information.

6. The artificial intelligence air conditioner according to claim 5, wherein the image sensor data includes at least one of red-green-blue (RGB) sensor data, infrared sensor data, or depth sensor data, and
the processor is configured to determine at least one of a number of persons or an opening/closing state of a window by using the image sensor data.

7. The artificial intelligence air conditioner according to claim 6, wherein a sensor data estimation model includes the first sensor data estimation model or the second sensor data estimation model,
the first sensor data estimation model is configured to output first estimated sensor data from the received external sensor data and the received environment information, and
the second sensor data estimation model is configured to output second estimated sensor data from the acquired sensor data, the received external sensor data, and the received environment information.

8. The artificial intelligence air conditioner according to claim 7, wherein the processor is configured to generate the estimated sensor data from the received external sensor data and the received environment information by using the first sensor data estimation model based on the acquired sensor data corresponding to null sensor data.

9. The artificial intelligence air conditioner according to claim 7, wherein the sensor data estimation model includes an artificial neural network and is trained using a machine learning algorithm or a deep learning algorithm.

10. The artificial intelligence air conditioner according to claim 9, wherein the sensor data estimation model is learned by using training data, and
the training data includes normal sensor data corresponding to the sensor unit, and external sensor data and environment information acquired from the external air conditioner or the IoT device.

11. The artificial intelligence air conditioner according to claim 10, wherein the sensor data estimation model is trained to minimize a difference between the estimated sensor data output for each item of the training data and the normal sensor data corresponding to the item.

12. The artificial intelligence air conditioner according to claim 1, wherein the processor is configured to provide an alarm notifying generation of abnormal sensor data based on the acquired sensor data being determined to be abnormal, and
the alarm notifying generation of the abnormal sensor data includes at least one of a visual alarm, a sound alarm, or a vibration alarm.

13. The artificial intelligence air conditioner according to claim 12, wherein the processor is configured to transmit a control signal for outputting the alarm notifying generation of the abnormal sensor data to a user terminal through the communication unit.

14. A method for calibrating sensor data of an air conditioner, the method comprising:
acquiring sensor data using a sensor unit;
receiving external sensor data and environment information from at least one of an external air conditioner or an internet of things (IoT) device;
generating estimated sensor data corresponding to the sensor unit using at least one of (i) a first sensor data estimation model based on the received external sensor data and the received environment information or (ii) a second sensor data estimation model based on the acquired sensor data, the received external sensor data, and the received environment information;
determining whether the acquired sensor data are abnormal using a result of comparing the generated estimated sensor data to the acquired sensor data;
performing an air conditioning function using the acquired sensor data based on the acquired sensor data being determined to be normal; and
performing the air conditioning function using the generated estimated sensor data based on the acquired sensor data being determined to be abnormal.

15. A record medium recorded with a program for performing a method for calibrating sensor data of an air conditioner, wherein the method comprises:
acquiring sensor data using a sensor unit;
receiving external sensor data and environment information from at least one of an external air conditioner or an internet of things (IoT) device;
generating estimated sensor data corresponding to the sensor unit using at least one of (i) a first sensor data estimation model based on the received external sensor data and the received environment information or (ii) a second sensor data estimation model based on the acquired sensor data, the received external sensor data and the received environment information;
determining whether the acquired sensor data are abnormal using a result of comparing the generated estimated sensor data to the acquired sensor data;
performing an air conditioning function using the acquired sensor data based on the acquired sensor data being determined to be normal; and
performing the air conditioning function using the generated estimated sensor data based on the acquired sensor data being determined to be abnormal.

16. The artificial intelligence air conditioner according to claim 7, wherein the processor is configured to perform the air conditioning function by using average data of the first estimated sensor data and the second estimated sensor data.

17. The method according to claim 14, wherein determining whether the acquired sensor data are abnormal comprises:
calculating a difference between a value of the estimated sensor data and a value of the acquired sensor data; and determining that the acquired sensor data are abnormal based on the calculated difference exceeding a predetermined first reference value.

18. The method according to claim 14, wherein determining whether the acquired sensor data are abnormal comprises:
- calculating a difference between a value of the estimated sensor data and a value of the acquired sensor data;
- calculating a ratio of the calculated difference to the value of the estimated sensor data; and
- determining that the acquired sensor data are abnormal based on the calculated difference exceeding a predetermined second reference value.

19. The method according to claim 14, wherein the air conditioning function is performed by using average data of the first estimated sensor data determined from the first sensor data estimation model and the second estimated sensor data determined from the second sensor data estimation model.

* * * * *